April 30, 1963 P. S. HUDSON ET AL 3,087,844
SOLID COMPOSITE PROPELLANTS CONTAINING AZIRIDINYL CURING AGENTS
Filed July 24, 1959
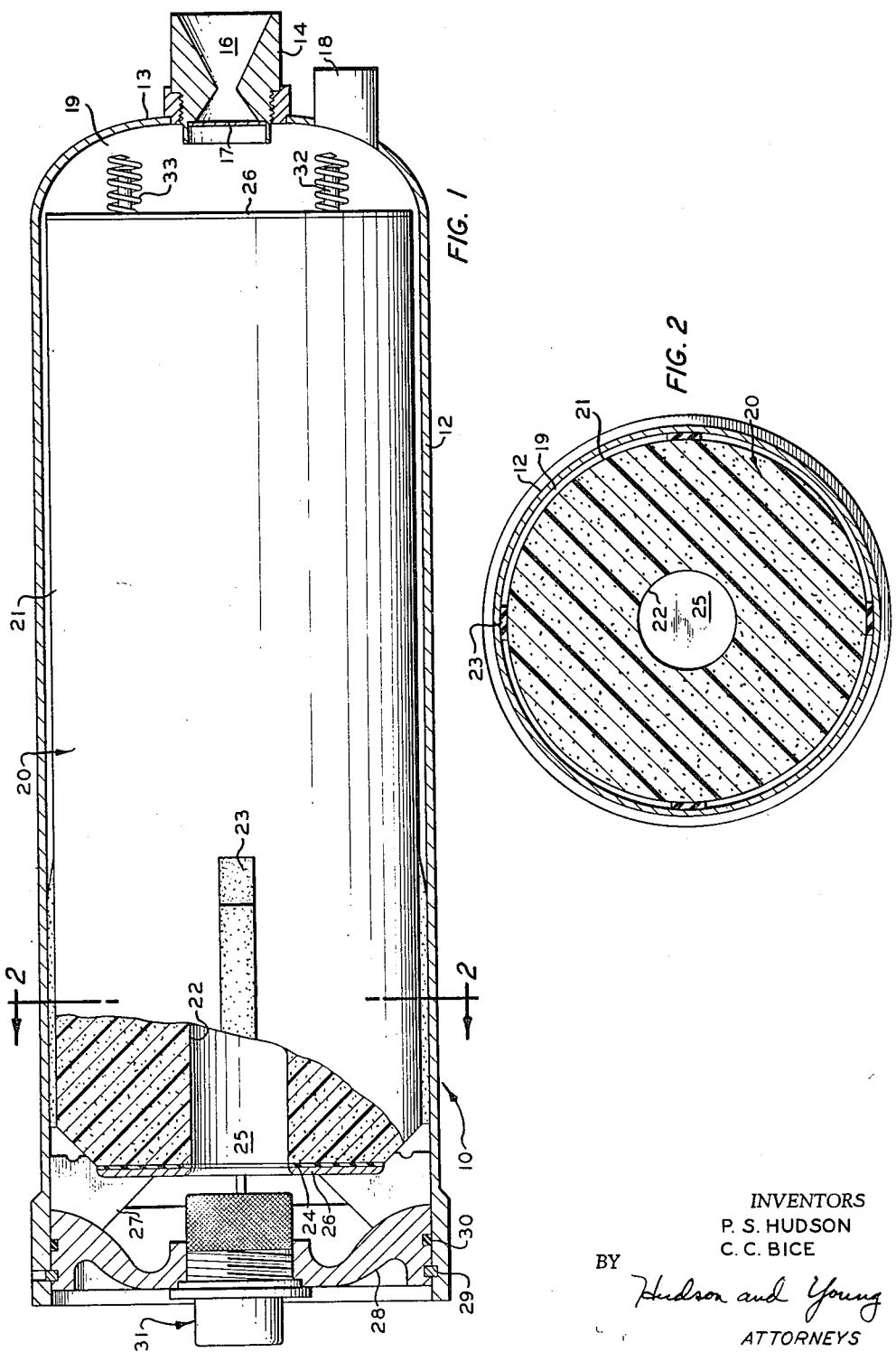
INVENTORS
P. S. HUDSON
C. C. BICE
BY Hudson and Young
ATTORNEYS United States Patent Office 3,087,844
Patented Apr. 30, 1963

3,087,844
SOLID COMPOSITE PROPELLANTS CONTAINING AZIRIDINYL CURING AGENTS
Paul S. Hudson and Charles C. Bice, Bartlesville, Okla., assignors to Phillips Petroleum Company, a corporation of Delaware
Filed July 24, 1959, Ser. No. 829,462
23 Claims. (Cl. 149—19)

This invention relates to improved solid propellants. In one aspect it relates to high energy solid propellants of the composite type particularly useful in jet propulsion devices such as missiles, rocket motors of the type employed to assist the takeoff of aircraft, gas generators and the like. In another aspect the invention relates to improved jet propulsion devices such as rocket motors loaded with novel high energy solid propellant.

In the past fifteen years or so, great interest has developed in solid propellants for jet propulsion devices such as missiles, rocket motors, gas generators, and the like. One type of solid propellant which has received considerable attention is that of the composite type, a typical composite propellant being one that uses an organic material as the fuel and binder, and a solid oxidant such as ammonium nitrate. In this type of propellant particularly when the propellant comprises a major proportion of a crystalline oxidizer and a minor proportion of the fuel and binder, the problem is presented of adjusting the physical properties of the propellant because of the small proportion of the binder material. Thus, it is difficult to provide suitable adhesion to the particles of oxidizer and the matrix of binder material is so tenuous that it is difficult to provide sufficient strength and elasticity in the propellant structure. Also in many cases it is desirable and necessary to be able to cast or pour the propellant into a rocket case or mold and then cure to a solid having suitable properties. In addition, since the binder also forms a fuel or part of the fuel it must have suitable chemical properties for this purpose.

An object of this invention is to provide an improved solid propellant.

Another object of this invention is to provide a propellant having desirable physical properties, particularly for use in devices such as jet propulsion devices, missiles, rocket motors employed to assist the takeoff of aircraft, gas generators and the like.

Still another object of this invention is to provide an improved jet propulsion device such as a rocket motor loaded with a novel improved solid propellant.

These and other objects of the invention will become more readily apparent from the following detailed description and discussion.

The foregoing objects are realized broadly by providing a rocket propellant comprising an inorganic oxidizing salt and a synthetic polymer or copolymer containing terminal acidic groups or a synthetic copolymer of an unsaturated carboxylic acid, which has been reacted with a tri-(aziridinyl)phosphine oxide or a tri-(aziridinyl)phosphine sulfide.

The solid propellants of this invention can contain in addition to the binder fuel a powdered metal such as aluminum and various compounding ingredients commonly employed in making composite propellants, such as plasticizers, oxidation inhibitors, reinforcing agents, wetting agents, modifiers, vulcanizing agents, curing agents, accelerators, burning rate catalysts, and the like. The propellant composition can be formed into a grain having any desired shape or geometry, such as grains of the internal, external and internal-external burning types. These grains can be molded or extruded and can be restricted with any suitable and well-known restricting material, such as rubber.

The invention is best described by reference to the accompanying drawings of which:

FIGURE 1 is a side elevational view in partial section of a rocket motor loaded with the propellant charge of this invention; and FIGURE 2 is a cross-sectional view of FIGURE 1 taken along the plane indicated.

Referring to the figures, there is illustrated a rocket motor 10, the particular jet propulsion device shown being that employed to assist the takeoff of aircraft, which device is known in the art as a JATO unit. The rocket motor 10 comprises a cylindrical casing 12 made of metal or the like, which has a reduced aft portion 13 having an axial opening into which a reaction nozzle 14 is threaded or otherwise secured. The nozzle is formed with internal restrictions so as to define a converging-diverging passage 16 of the De Laval type through which combustion gases pass. A blow-out diaphragm or starter disc 17, which is mounted across the passage 16, is designed so as to be ejected through the nozzle passage when the pressure in the rocket motor reaches a predetermined value, e.g., between 200 and 500 p.s.i. The reduced casing portion 13 is also provided with a safety plug attachment 18 which is adapted to rupture or otherwise function at a predetermined combustion chamber pressure so as to relieve excessive pressures which might otherwise rupture the rocket motor or cause an explosion. The cylindrical casing 12 defines a combustion chamber 19 in which is disposed a charge 20 of the novel solid propellant of this invention. The specific propellant charge illustrated is cylindrical in shape and has an outer diameter smaller than the inner diameter of the casing. The propellant charge 20 is an internal-external burning type by reason of its exposed or unrestricted outer cylindrical surface 21 and its inner exposed cylindrical surface 22 which is defined by an axial perforation 25 extending the length of the propellant. A plurality of resilient retaining pads 23, for example, strips of sponge rubber, are positioned between the head portion of the external burning surface and the adjacent head portion of the casing. The ends of the propellant are restricted by means of a layer of restricting material 24 which has a central opening in alignment with the axial perforation 25. Retaining plates 26 having similar openings cover the outside of the restricting material 24. Secured to the head retaining plate are outer-extending prongs or leg 27 which are adapted to register with and are held in place by head closure assembly 28 having retention means for igniter assembly 31. Head closure assembly 28 is held in position in the head end of casing 12 by means of key 29 which fits into appropriate grooves formed in the casing and head closure assembly 28. A sealing ring 30 is positioned in a groove cut into assembly 28 to prevent escape of combustion gases from the head end of the casing. The head end of the cylindrical casing is closed by means of head closure assembly 28 in combination with igniter assembly 31 which is retained in the opening provided in the axial portion of the assembly 28. It is noted that the igniter assembly 28 is provided with a removable cover which extends outwardly from this axial opening. The aft retaining plate has secured to its outer surface a plurality of prongs 32. The prongs are each surrounded by a compression spring 33 adapted to come into contact with the reduced portion 13 of the casing. The aft retaining plate is thereby maintained firmly against the restricting material which covers the aft end of the solid propellant charge 20.

It is to be understood that rocket motor 10 is merely illustrative of a preferred type of jet propulsion device which can be loaded with a solid propellant charge fabricated in accordance with this invention. While the rocket motor illustrated is shown loaded with a single grain of solid propellant, it is to be understood that it can be loaded with a plurality of grains of solid propellant assembled in any desired fashion. Any suitable charge support means and igniter can be used other than that shown in the drawing for illustrative purposes.

In the operation of the rocket motor shown in the drawing, the motor is armed by removing the cover from the igniter assembly 28 and connecting suitable plugs thereof to an electrical circuit, not shown, which includes a source of power. Upon closing of a suitable switch, electric current fires squibs, matches, or the like, embedded in the ignition material within the igniter assembly 31, causing the ignition of the ignition material. The firing of the igniter 31 results in the formation of hot ignition products which are released from the igniter 31 and immediately propagate throughout the combustion chamber 19, heat from the ignition products being transferred to the exposed burning surfaces 21, 22 of the solid propellant charge 20, raising the surface thereof to an ignition temperature. The resulting ignition of the propellant charge 20 and its subsequent burning or consumption results in generating hot combustion gases which raise the pressure and temperature within the combustion chamber. When a predetermined starter disc bursting pressure is reached, for example, 200–500 p.s.i., the starter disc 17 functions, for example, by rupturing, and it is expelled from the rocket motor via the passage 16. The gases are then free to flow at a high velocity from the combustion chamber 19 through the constricted nozzle 16, thereby imparting thrust to the rocket motor.

As previously mentioned the novel solid propellants of this invention comprise an inorganic oxidizing salt and a synthetic polymer or copolymer containing terminal acidic groups, or a synthetic copolymer of an unsaturated carboxylic acid which has been reacted with a material selected from the group consisting of tri-(aziridinyl)phosphine oxides and tri-(aziridinyl)phosphine sulfides. Particularly useful inorganic oxidizing salts include the ammonium, alkali metal, and alkaline earth metal salts of nitric, perchloric and chloric acids and mixtures thereof, such as sodium, potassium, magnesium and ammonium perchlorates, lithium and strontium chlorates, and potassium, sodium, calcium and ammonium nitrates.

The polymers which are utilized in the solid propellants of this invention comprise polymers prepared from a wide variety of materials. These materials include conjugated dienes containing from 4 to 12 carbon atoms and preferably 4 to 8 carbon atoms, such as 1,3-butadiene, isoprene, piperylene, methylpentadiene, 2-ethyl-1,3-butadiene, phenylbutadiene, 3,4-dimethyl-1,3-hexadiene, 4,5-diethyl-1,3-octadiene, etc. In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable. In addition to the conjugated dienes other monomers which can be employed are aryl-substituted olefins, such as styrene, various alkyl styrenes, paramethoxystyrene, vinylnaphthalene, vinyltoluene, and the like; heterocyclic nitrogen-containing monomers, such as pyridine and quinoline derivatives containing at least 1 vinyl or alphamethylvinyl group, such as 2-vinylpyridine, 3-vinylpyridine, 4-vinylpyridine, 3-ethyl - 5 - vinylpyridine, 2-methyl-5-vinylpyridine, 3,5-diethyl-4-vinylpyridine, etc.; similar mono- and di-substituted alkenyl pyridines and the like quinolines; acrylic acid esters, such as methyl acrylate, ethyl acrylate; alkacrylic acid esters, such as methyl methacrylate, ethyl methacrylate, propyl methacrylate, ethyl methacrylate butyl methacrylate; methyl vinyl ether, vinyl chloride, vinylidene chloride, vinylfuran, vinylcarbazole, vinylacetylene, etc.

The above compounds in addition to being polymerizable alone are also copolymerizable with each other and may be copolymerized to form terminally reactive polymers. In addition, copolymers can be prepared using minor amounts of copolymerizable monomers containing more than one vinylidene group such as 2,4-divinylpyridine, divinylbenzene, 2,3-divinylpyridine, 3,5-divinylpyridine, 2,4-divinyl6-methylpyridine, 2,3-divinyl-5-ethylpyridine, and the like.

In the first step of the preparation of the polymers containing terminal acidic groups the monomer or monomers which it is desired to polymerize are contacted with an organo alkali metal compound, preferably an organo polyalkali metal compound. The organo alkali metal compounds contain at least 1 and preferably from 2 to 4 alkali metal atoms, and those containing 2 alkali metal atoms are more often employed. As will be explained hereinafter, lithium is the preferred alkali metal.

The organo alkali metal compounds can be prepared in several ways, for example, by replacing halogens in an organic halide with alkali metals, by direct addition of alkali metals to a double bond, or by reacting an organic halide with a suitable alkali metal compound.

The organo alkali metal compound initiates the polymerization reaction, the organo radical being incorporated in the polymer chain and the alkali metal being attached terminally to at least one end of the polymer chain. When employing polyalkali metal compounds an alkali metal is attached terminally at each end of the polymer chain. The polymers in general will be linear polymers having two ends; however, polymers containing more than two ends can be prepared within the scope of the invention. These polymers can be represented by the general formula $QY_n$ where Q comprises the polymer as previously described and Y is an alkali metal, $n$ being an integer of 1 to 4. The general reaction can be illustrated graphically as follows:

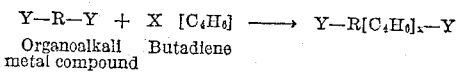

Organoalkali metal compound   Butadiene or

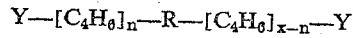

or combinations thereof.

A specific example is:

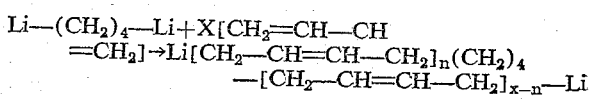

In the specific example 1,4-addition of butadiene is shown; however, it should be understood that 1,2-addition can also occur.

While organo compounds of the various alkali metals can be employed in carrying out the polymerization, by far the best results are obtained with organolithium compounds which give very high conversions to the terminally reactive polymer. With organo compounds of the other alkali metals, the amount of monoterminally reactive polymer, that is, polymer having alkali metal at only one end of the chain is substantially higher. The alkali metals, of course, include sodium, potassium, lithium, rubidium, and cesium. The organic radical of the organo alkali metal compound can be an aliphatic cycloaliphatic or aromatic radical. For example, mono-, di- and polyalkali metal substituted hydrocarbons can be employed including methyllithium, n-butyllithium, n-decyllithium, phenyllithium, naphthyllithium, p-tolyllithium, cyclohexyllithium, 4-butylphenylsodium, 4-cyclohexylbutylpotassium, isopropylrubidium, 4-phenylbutylcesium, 1,4-dilithiobutane, 1,5 - dipotassiopentane, 1,4-disodio-2-methylbutane, 1,6-dilithiohexane, 1,10 - dilithiodecane, 1,15 - dipotassiopentadecane, 1,20-dilithioeicosane, 1,4-disodio-2-butene, 1,4-dilithio-2-methyl-2-butene, 1,4-dilithio-2-butene, 1,4-dipotassio-2-butene, dilithionaphthalene, disodionaphthalene, 4,4'-dilithiobiphenyl, disodiophenanthrene, dilithioanthracene, 1,2-dilithio-1,1-diphenylethane, 1,2-disodio-1,2,3-triphenylpropane, 1,2-dilithio - 1,2 - diphenylethane, 1,2-dipotassiotriphenylethane, 1,2 - dilithiotetraphenylethane, 1,2-dilithio-1-phenyl-1-naphthylethane, 1,2-dilithio-1,2-dinaphthylethane, 1,2 - disodio-1,1-diphenyl-2-naphthylethane, 1,2-dilithiotrinaphthylethane, 1,4-dilithiocyclohexane, 2,4-disodioethylcyclohexane, 3,5-dipotassio-n-butylcyclohexane, 1,3,5-trilithiocyclohexane, 1-lithio-4-(2-lithiomethylphenyl)butane, 1,2-dipotassio - 3 - phenylpropane, 1,2-di(lithiobutyl)benzene, 1,3-dilithio-4-ethylbenzene, 1,4-dirubidiobutane, 1,8-dicesiooctane, 1,5,12-trilithiododecane, 1,4,7-trisodioheptane, 1,4-di(1,2-dilithio-2-phenylethyl)benzene, 1,2,7,8 - tetrasodionaphthalene, 1,4,7,10-tetrapotassiodecane, 1,5-dilithio-3-pentyne, 1,8-disodio-5-octyne, 1,7-dipotassio-4-heptyne, 1,10-dicesio - 4 - decyne, and 1,11-dirubidio-5-hendecyne, 1,2-disodio-1,2-diphenylethane, dilithiophenanthrene, 1,2-dilithiotriphenylethane, 1,2-disodio-1,1-diphenylethane, dilithiomethane, 1,4-dilithio-1,1,4,4-tetraphenylbutane, 1,4 - dilithio-1,4-dinaphthylbutane and the like.

While the organo alkali metal initiators in general can be employed, certain specific initiators give better results than others and are preferred in carrying out the preparation of the terminally reactive polymers. For example of the condensed ring aromatic compounds the lithiumanthracene adduct is preferred, but the adducts of lithium with naphthalene and biphenyl can be employed wtih good results. Of the compounds of alkali metals with polyaryl-substituted ethylenes, the preferred material is 1,2-dilithio-1,2-diphenylethane (lithium-stilbene adduct).

Ordinarily the dilithio compounds are preferred as being more effective in promoting the formation of terminally reactive polymers. The polymers thus formed are especially well suited for use in our invention as binders for castable rocket propellant mixtures since such materials can be cured from the liquid state to rubbery solids. The organo dialkali metal compounds which have been set forth as being preferred, are those which when prepared contain a minimum of the monoalkali metal compound. The amount of initiator which can be used will vary depending on the polymer prepared, and particularly the molecular weight desired. Usually the terminally reactive polymers which are liquids have molecular weights in the range of 1000 to about 20,000. Depending upon the monomers employed and the amount of initiator used, semisolid and solid terminally reactive polymers can be prepared. Usually the initiator is used in amounts between about 0.25 and about 100 millimoles per 100 grams of monomer.

Preparation of the polymers containing terminal alkali metal atoms is generally carried out in the range of between —100 and +150° C., preferably between —75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired products with the other alkali metal compounds. The amount of initiator employed can vary but is preferably in the range of between about 1 and about 30 millimoles per 100 grams of monomers. It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organo alkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

The terminally reactive polymers prepared as hereinbefore set forth contain an alkali metal atom on at least one end and preferably on each end of the polymer chain and the organic radical of the initiator is present in the polymer chain. These terminally reactive polymers when treated with suitable reagents such as carbon dioxide, sulfuryl chloride, etc., and hydrolyzed provide polymers containing terminal acid groups. The acidic groups include groups such as SOH, $SO_2H$, $SO_3H$, COOH, $SeO_2H$, $SeO_3H$, $SiO_2H$, $SnO_2H$, $SbO_2H$, SbOH, $SbO_3H_2$, $TeO_2H$, $TeO_3H$, $AsO_2H$, AsOH, $AsO_3H_2$, $AsO_3H_3$. The following reactions present examples of specific methods which can be employed to introduce the terminal acid groups. In these equations Q designates a polymer chain.

(1) Li—Q—Li+$2CO_2$→$LiCO_2$—Q—$CO_2Li$
Li—$CO_2$—Q—$CO_2Li$+2HCl→HOOC—Q—COOH+2LiCl
(2) Li—Q—Li+$SO_2Cl_2$→$LiSO_2Cl_2$—Q—$SO_2Cl_2Li$
$LiSO_2Cl_2$—Q—$SO_2Cl_2Li$+$2H_2O$→$HO_3S$—Q—$SO_3H$+2LiCl+2HCl

Reaction of terminally reactive polymer containing alkali metal atoms with the acid forming reagents can be carried out over a wide range of temperatures, for example —75° C. to +75° C., and preferably utilizing an amount of reagent in excess of stoichiometric.

The monomers hereinbefore described for use in preparation of terminal reactive polymers containing alkali metal atoms can also be recated with unsaturated carboxylic acids to provide liquid polymers suitable for use in carrying out the invention. Unsaturated carboxylic acids which can be employed include acids containing up to 36 carbon atoms, from 1 to 5 double bonds and 1 or 2 carboxyl groups. Also included are the so-called "dimerized" acids, i.e. where two molecules of an acid are linked by destroying one of the double bonds. Illustrative of specific acids which can be used are acids such as acrylic acid, methacrylic acid, itaconic acid, palmitoleic acid, oleic acid, ricinoleic acid, arachidonic acid, erucic acid, selacholeic acid, fumaric acid, maleic acid, and the like. Reaction of the monomer with the unsaturated carboxylic acid can be carried out over a wide range of temperatures depending on the particular monomer and the particular acid employed; e.g. at temperatures between about —50 and about +100° C. The amount of acid employed in the reaction can vary to provide polymers having an acid equivalence of from as low as 0.005 to as high as 0.2 equivalents per 100 grams of polymer product.

The tri(aziridinyl)phosphine oxides and sulfides employed in the invention can be represented by the formula

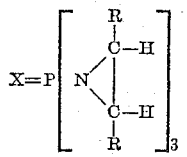

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl and aralkyl radicals and the R's can be unlike. Specific phosphine reactants which can be used include tri(1-aziridinyl)phosphine oxide,
tri(2-methyl-1-aziridinyl)phosphine oxide,
tri(2,3-dimethyl-1-aziridinyl)phosphine oxide,
tri(2-isopropyl-1-aziridinyl)phosphine oxide,
tri(2-methyl-3-ethyl-1-aziridinyl)phosphine oxide,
tri(2-isopropyl-1-aziridinyl)phosphine oxide,
tri(2-methyl-3-n-butyl-1-aziridinyl)phosphine oxide,
tri(2-hexyl-1-aziridinyl)phosphine oxide,
tri(2,3-diheptyl-1-aziridinyl)phosphine oxide,
tri(2-methyl-3-octyl-1-aziridinyl)phosphine oxide,
tri(2-ethyl-3-decyl-1-aziridinyl)phosphine oxide,
tri(2-dodecyl-1-aziridinyl)phosphine oxide,
tri(2-methyl-3-tridecyl-1-aziridinyl)phosphine oxide,
tri(2-ethyl-3-octadecyl-1-aziridinyl)phosphine oxide,
tri(2-eicosyl-1-aziridinyl)phosphine oxide,
tri(2-methyl-3-cyclopentyl-1-aziridinyl)phosphine oxide,
tri(2-ethyl-3-cyclohexyl-1-aziridinyl)phosphine oxide,
tri[2-n-butyl-3-(4-methylcyclohexyl)1-aziridinyl] phosphine oxide,
tri(2-phenyl-1-aziridinyl)phosphine oxide,
tri(2-phenyl-3-tetradecyl-1-aziridinyl)phosphine oxide,
tri(2,3-diphenyl-1-aziridinyl)phosphine oxide,
tri(2-tert-butyl-3-phenyl-1-aziridinyl)phosphine oxide,
tri[2-ethyl-3-(1-naphthyl)1-aziridinyl]phosphine oxide,
tri[2-n-propyl-3-(2-naphthyl)1-aziridinyl]phosphine oxide,
tri(2-methyl-3-benzyl-1-aziridinyl)phosphine oxide,
tri(2-nonyl-3-benzyl-1-aziridinyl)phosphine oxide,
tri[2-n-propyl-3-(2-phenylethyl)1-aziridinyl]phosphine oxide,
tri[2-methyl-3-(4-methylphenyl)1-aziridinyl]phosphine oxide,
tri[2-ethyl-3-(3-n-propylphenyl)1-aziridinyl]phosphine oxide,
tri[2-heptyl-3-(2,4-dimethylphenyl)1-aziridinyl] phosphine oxide,
tri(1-aziridinyl)phosphine sulfide,
tri(2-methyl-1-aziridinyl)phosphine sulfide,
tri(2,3-dimethyl-1-aziridinyl)phosphine sulfide,
tri(2,3-diethyl-1-aziridinyl)phosphine sulfide,
tri(2-methyl-3-isopropyl-1-aziridinyl)phosphine sulfide,
tri(2-tert-butyl-1-aziridinyl)phosphine sulfide,
tri(2,3-didecyl-1-aziridinyl)phosphine sulfide,
tri(2-ethyl-3-pentadecyl-1-aziridinyl)phosphine sulfide,
tri(2-eicosyl-1-aziridinyl)phosphine sulfide,
tri(2-methyl-3-cyclohexyl-1-aziridinyl)phosphine sulfide,
tri(2-phenyl-1-aziridinyl)phosphine sulfide,
tri(2-phenyl-3-benzyl-1-aziridinyl)phosphine sulfide,
tri(2,3-diphenyl-1-aziridinyl)phosphine sulfide,
tri(2-ethyl-3-phenyl-1-aziridinyl)phosphine sulfide, and
tri(2-amyl-3-benzyl-1-aziridinyl)phosphine sulfide.

In accordance with the invention the polymers hereinbefore described are admixed with the tri(aziridinyl)phosphine oxide or sulfide and the inorganic oxidizing salt, after which the mixture is suitably increased in temperature such that reaction occurs between the polymer and the phosphine to provide a solid propellant structure. In the preparation of the binder from liquid polymer the polymer and phosphine reactant are placed in a suitable dispersant-type mixer and thoroughly mixed for a period of 1 to 10 minutes. The oxidizer which is finely powdered to a size in the range of from about 1 to 200 microns is then added and mixing is continued for a period of 15 to 45 minutes under vacuum. During the latter mixing step the temperature is gradually increased to a temperature between about 100 to 300° F., preferably between about 150 and about 200° F. The material at this stage is a viscous slush, which is then poured into a rocket case or suitable mold. The filled mold is placed in an oven and cured for 24 to 48 hours or more at temperatures in the range of 150 to 200° F. Semi-solid polymers can be blended with the phosphine reactant and oxidizer and the mixture extruded to form a curable propellant grain.

As mentioned previously, the propellants of this invention can contain a powered metal, for example aluminum, boron, magnesium, beryllium, and the like. Alloys can also be used such as the aluminum alloys of boron, magnesium, manganese, copper and the like. Silicon can also be utilized and the term "metal" is used herein to include silicon. Generally the components of the solid propellant compositions of this invention are present ni the relative amounts set forth in Table I.

TABLE I

| Component: | Weight percent |
|---|---|
| Inorganic oxidizing salt | 75–90 |
| Acidic polymer | 10–25 |
| Powdered metal | 0–25 |

Various types of compounding ingredients including fillers such as carbon black and mineral fillers can be incorporated in the polymer prior to reaction of the polymer with the phosphine reactant. Where it is desired to closely control the burning rate of the propellant composition suitable burning rate catalysts can be incorporated therein. These catalysts include materials such as ferrocyanides sold under various trade means, such as Prussian blue, Steel blue, Bronze blue, Turnbull's blue, Chinese blue, New blue, Antwerp blue, Mineral blue, Paris blue, Berlin blue, Hamburg blue, Williamson blue, and the like. Other useful burning rate catalysts include copper chromite, ammonium dichromate, potassium dichromate, sodium dichromate and the like.

The following examples are presented in illustration of the invention.

Butadiene polymer containing terminal carboxy groups was prepared by reacting the following formulation for 1.5 hours at 122° F.

| | Parts by weight |
|---|---|
| Butadiene | 100 |
| Toluene | 860 |
| Dilithiostilbene | 4.85–7.75 |

Carbon dioxide under pressure was then passed into the reaction mixture until saturation was attained. The reaction mixture was acidified with HCl dissolved in isobutylalcohol and washed with water until neutral. One percent of phenyl-beta-naphthylamine was added and the solvent was stripped off under a vacuum. The polymer thus formed is identified as a carboxy telechelic polybutadiene.

The dilithiostilbene used in the above formulation was prepared by reacting the following formulation at 122° F. for two hours after which excess lithium was filtered off.

| | | |
|---|---|---|
| Trans-stilbene | mols | 9.15 |
| Lithium wire | do | 0.45 |
| Diethyl ether | milliliters | 450 |
| Tetrahydrofuran | do | 450 |

Polymer PBAA-108 is a commercially available copolymer of butadiene and acrylic acid emulsion polymerized at 50° C. to 60 percent conversion. The viscosity of the polymer is about 300 poises at 25° C. The approximate formulation for the polymerization is:

| | Percent |
|---|---|
| Butadiene | 92 |
| Acrylic acid | 6 |
| Mercaptan | 1–2 |
| Antioxidant | 1 |

Hycar 2000 x 131 is commercially available and substantially the same as polymer PBAA-108.

Propellant compositions were prepared from the foregoing polymers as follows:

*Example I*

| Run No. | Ingredients | Weight percent |
|---|---|---|
| 1 | Carboxy telechelic polybutadiene | 16.0 |
| | ZP-211 [1] | 3.2 |
| | Tri (2-methyl-1-aziridinyl) phosphine oxide | 0.8 |
| | Ammonium perchlorate | 80.0 |

[1] Plasticizer (5,8,11,13,16,19-hexoxa tricosane) commercially available.

*Example II*

| Run No. | Ingredients | Weight percent |
|---|---|---|
| 2 | PBAA-108 | 19.4 |
| | Tri (2-methyl-1-aziridinyl) phosphine oxide | 0.6 |
| | Ammonium perchlorate | 80.0 |

*Example III*

| Run No. | Ingredients | Weight percent |
|---|---|---|
| 3 | PBAA-108 | 19.2 |
| | Tri (2-methyl-1-aziridinyl) phosphine oxide | 0.8 |
| | Ammonium perchlorate | 80.0 |

*Example IV*

| Run No. | Ingredients | Weight percent |
|---|---|---|
| 4 | PBAA-108 | 18.8 |
| | Tri (2-methyl-1-aziridinyl) phosphine oxide | 1.2 |
| | Ammonium perchlorate | 80.0 |

*Example V*

| Run No. | Ingredients | Weight percent |
|---|---|---|
| 5 | Hycar 2000 x 131 | 19.2 |
| | Tri (2-methyl-1-aziridinyl) phosphine oxide | 1.8 |
| | Ammonium perchlorate | 80.0 |

The following controls were also run.

*Example VI*

| Run No. | Ingredients | Weight percent |
|---|---|---|
| 6 | PBAA-108 | 18.0 |
| | Epon 562 [1] | 2.0 |
| | Ammonium perchlorate | 80.0 |

[1] Liquid aliphatic epoxide resin; molecular weight 304; 140–165 epoxide equivalents (grams resin containing one gram equivalent of epoxide) commercially available.

*Example VII*

| Run No. | Ingredients | Weight percent |
|---|---|---|
| 7 | Hycar 2000 x 131 | 17.9 |
| | Epon 562 | 2.1 |
| | Ammonium perchlorate | 80.0 |

*Example VIII*

| Run No. | Ingredients | Weight percent |
|---|---|---|
| 8 | Carboxy telechelic polybutadiene | 19.6 |
| | Tri (2-methyl-1-aziridinyl) phosphine oxide | 0.4 |
| | Ammonium perchlorate | 68.0 |
| | Aluminum | 12.0 |

The properties of the foregoing compositions are given in the table.

TABLE II

| Run No. | Temp. (°F.) | $S_m$ (p.s.i.) | $S_b$ (p.s.i.) | $\epsilon_m$ [1] (percent) | $\epsilon_b$ [1] (percent) | E [1] (p.s.i.) |
|---|---|---|---|---|---|---|
| (1) Carboxy telechelic polybutadiene. | 75 | 68 | -------- | 39 | -------- | 288 |
| | -40 | 360 | -------- | 10 | -------- | 7,720 |
| (2) Butadiene/ acrylic acid copolymer. | 170 | 21 | 20 | 56 | 64 | 53 |
| | 75 | 30 | 26 | 49 | 55 | 95 |
| | -40 | 83 | 50 | 28 | 65 | 642 |
| | -70 | 206 | 93 | 12 | 54 | 3,865 |
| (3) Butadiene/ acrylic acid copolymer. | 170 | 48 | 45 | 34 | 41 | 179 |
| | 75 | 68 | 64 | 39 | 45 | 245 |
| | -40 | 176 | 142 | 37 | 58 | 1,060 |
| | -70 | 318 | 240 | 18 | 44 | 5,021 |
| (4) Butadiene/ acrylic acid copolymer. | 170 | 56 | -------- | 11 | -------- | 610 |
| | 75 | 90 | 84 | 14 | 16 | 741 |
| | -40 | 367 | 340 | 17 | 22 | 2,890 |
| | -75 | 598 | 531 | 13 | 15 | 6,750 |
| (5) Butadiene/ acrylic acid copolymer. | 170 | 47 | 46 | 10 | 11 | 551 |
| | 75 | 55 | 54 | 11 | 13 | 615 |
| | -40 | 196 | 160 | 17 | 23 | 1,557 |
| | -70 | 325 | 254 | 15 | 24 | 3,307 |
| (6) Butadiene/ acrylic acid copolymer (Epon cure). | 170 | 29 | 28 | 34 | 36 | 108 |
| | 75 | 40 | 36 | 35 | 41 | 120 |
| | -40 | 147 | 94 | 16 | 33 | 3,582 |
| | -75 | 326 | 226 | 9 | 22 | 7,425 |
| (7) Butadiene/ acrylic acid copolymer (Epon cure). | 170 | 45 | 44 | 25 | 28 | 216 |
| | 75 | 76 | 73 | 32 | 36 | 314 |
| | -40 | 150 | 136 | 42 | 50 | 730 |
| | -70 | 250 | 183 | 15 | 47 | 5,560 |
| (8) Carboxy telechelic polybutadiene. | 170 | 72 | 68 | 63 | 67 | 209 |
| | 75 | 96 | 92 | 84 | 94 | 290 |
| | -40 | 453 | 211 | 11 | 62 | 14,563 |
| | -70 | 1643 | -------- | 1 | -------- | 230,833 |

[1] See "Method for Determining the Tensile Properties of Solid Rocket Propellants", Part II, Solid Propellant Information Agency, Johns Hopkins University, Silver Spring, Maryland, February 1957.

NOTE.—$S_m$—maximum tensile strength. $S_b$—tensile strength at break. $\epsilon_m$—elongation at maximum stress. $\epsilon_b$—elongation at break. E—Young's modulus.

The above data demonstrate that both the carboxy telechelic polymers and the butadiene/acrylic acid copolymers can be cured in admixture with an oxidizer with tri(aziridinyl)phosphine oxides to produce a composition having good mechanical properties. Runs 6 and 7 show a conventional composition cured with an epoxide ersin. In general the high temperature tensile strengths of the phosphine oxide cured propellants are superior to the epoxide cured compositions while the low temperature elongation properties compare favorably. An unsuccessful attempt was made to cure a composition similar to that used in run Number 1 using a stoichiometric amount of Epon 262 instead of the phosphine oxide.

*Example IX*

The propellant of Run No. 8 was fired three times with 1.5 lb. motors, with the following results.

TABLE III

|  | Strand | Motor |
|---|---|---|
| Burning rate at 1,000 p.s.i. (in./sec.) [1] | 0.28 | 0.29 |
| Pressure exponent [1] | 0.33 | 0.33 |
| Characteristic exhaust velocity (ft./sec.) [1] |  | 4,860 |
| $I_{sp}$ at 1,000 p.s.i. (lb.-sec./lb.) [1] |  | 224 |
| $I_{sp}$ corrected for heat loss (colorimeter) [1] |  | 241 |

[1] Strand burning rate data are obtained by burning strands of propellant approximately 3/16-inch in diameter in an atmosphere of pressurized nitrogen and determining the time required for the burning to progress a known distance (3 inches). Data points are determined at various pressures and a line of the general form $r=cP^n$ is fitted to the data. From this line the burning rate at 1000 p.s.i. is picked and the pressure exponent is equal to $n$ in the equation.

The motor data are obtained from firing grains with the approximate dimension 3-inch O.D., 1.5-inch I.D., 4.5 inch long with burning on the inside perforation and both ends. The grains are fired in a 6-inch long, 3.75-inch I.D. test motor. Records are made of pressure versus time, and thrust versus time. The integrals of pressure versus time and thrust versus time are determined and the following values are calculated.

$$C^a = \frac{\int P \, dt (A_t)(g.)}{\text{Grain weight}}$$

$$I_{sp} = \frac{\int F \, dt}{\text{Grain weight}}$$

$F$ = thrust $A_t$ = throat area $g$ = gravitational constant a Characteristic exhaust velocity.

The $I_{sp}$ values (specific impulse) are determined at the average firing pressure and are corrected to 1000 p.s.i. using methods outlined in Sutton, "Rocket Propulsion Elements," Wiley (1949).

Average pressure is determined by dividing $\int P \, dt$ by the burning time. Burning rate is determined by dividing the burning distance by the burning time. Data are obtained for firings at several average pressures and the points are fitted to an equation in the same manner as the strand burning rate data.

The specific impulse corrected for heat loss is determined by measuring the thermal energy absorbed by the rocket motor and making an estimate of the effect of this heat loss on the measured specific impulse.

*Example X*

Propellant compositions were prepared from carboxy telechelic copolymers of butadiene/styrene and of butadiene/isoprene. The formulations and mechanical properties are given in Table IV.

TABLE IV

| Composition | Weight percent | Test temp. (° F.) | $S_m$ (p.s.i.) | $S_b$ (p.s.i.) | $\epsilon_m$ (percent) | $\epsilon_b$ (percent) | E (p.s.i.) |
|---|---|---|---|---|---|---|---|
| Carboxy Telechelic, 90/10 butadiene-styrene. | 18.88 | 170 | 144 | 110 | 32.0 | 34.1 | 581 |
|  |  | 70 | 237 | 225 | 41.2 | 42.7 | 1,212 |
| Tri (aziridinyl) phosphine oxide | 1.12 | 0 | 555 | 539 | 17.1 | 20.3 | 6,675 |
| Ammonium perchlorate | 80.00 | −40 | 1,395 |  | 1.5 |  | 103,735 |
| Carboxy Telechelic, 80/20 butadiene-styrene. | 18.93 | 170 | 90 | 86 | 42.9 | 45.7 | 355 |
|  |  | 70 | 172 | 160 | 57.1 | 67.7 | 679 |
| Tri (aziridinyl) phosphine oxide | 1.07 | 0 | 452 | 392 | 22.9 | 42.1 | 5,060 |
| Ammonium perchlorate | 80.00 | −40 | 1,537 |  | 1.7 |  | 89,720 |
| Carboxy Telechelic, 80/20 butadiene-isoprene. | 19.42 | 170 | 81 | 73 | 31.8 | 41.3 | 409 |
|  |  | 70 | 161 | 149 | 56.2 | 64.6 | 607 |
| Tri (aziridinyl) phosphine oxide | 0.58 | −40 | 933 | 777 | 4.1 | 8.3 | 37,600 |
| Ammonium perchlorate | 80.00 | −70 | 1,573 |  | 0.8 |  | 166,835 |

The above data demonstrate unusual tensile strengths for the butadiene/styrene copolymers at ambient and higher temperatures. In addition these copolymers exhibited excellent castability. The butadiene/isoprene copolymers also compared well with the carboxy telechelic polybutadiene.

Having thus described the invention by providing specific examples thereof it is to be understood that no undue limitations or restrictions are to be drawn by reason thereof and that many variations and modifications are within the scope of the claims.

We claim:

1. A solid propellant composition comprising an inorganic oxidizing salt and a synthetic solid polymer formed by reacting in admixture with said salt an uncured polymer selected from the group consisting of liquid and semisolid polymer of a monomer selected from the group consisting of conjugated dienes having 4 to 12 carbon atoms per molecule, aryl-substituted olefins, pyridine and quinoline derivatives containing at least one member selected from the group consisting of vinyl and alphamethylvinyl, acrylic acid esters, alkacrylic acid esters, vinylfuran and vinylcarbazole, said uncured polymer containing at least 1 acid group of an element selected from the group consisting of carbon, silicon, tin, arsenic, antimony, sulfur, selenium, and tellurium per molecule, with a reactant material in sufficient amount to provide a solid propellant structure on reacting with said uncured polymer, said material having the formula

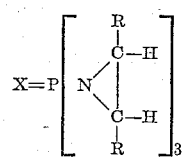

wherein X is selected from the group consisting of oxygen and sufur, P is phosphorus, the R's are radicals containing up to a total of 20 carbon atoms selected from the group consisting of hydrogen, alkyl, cycloalkyl, aryl, alkaryl, and aralkyl radicals, and the R's can be unlike.

2. The composition of claim 1 wherein said uncured polymer contains from 2 to 4 terminally positioned acid groups.

3. The composition of claim 2 in which the polymer is a polymer of butadiene and the reactant material is tri(2-methyl-1-aziridinyl)phosphine oxide.

4. The composition of claim 3 in which the polymer is polybutadiene, the acid group is a carboxyl group and the inorganic oxidizing salt is ammonium perchlorate.

5. The composition of claim 3 in which the acid group is a sulfuryl group and the inorganic oxidizing salt is ammonium perchlorate.

6. The composition of claim 1 wherein said uncured polymer is a copolymer of said monomer with an unsaturated carboxylic acid having a maximum of 36 carbon atoms, from 1 to 4 double bonds and from 1 to 2 carboxyl groups.

7. The composition of claim 6 in which the polymer is a polymer of butadiene with acrylic acid, the reactant material is tri(2-methyl-1-aziridinyl)phosphine oxide and the inorganic oxidizing salt is ammonium perchlorate.

8. A solid propellant composition comprising about 75 to 90 weight percent inorganic oxidizing salt and about 10 to 25 weight percent of a synthetic solid polymer formed by reacting in admixture with said salt a liquid polymer of a monomer selected from the group consisting of conjugated dienes having 4 to 12 carbon atoms per molecule, aryl-substituted olefins, pyridine and quinoline derivatives containing at least one member selected from the group consisting of vinyl and alphamethylvinyl, acrylic acid esters, alkacrylic acid esters, vinylfuran and vinylcarbazole, said liquid polymer containing at least 1 carboxyl group per molecule, with about 2.0 to 9.4 parts by weight per 100 parts of polymer of a reactant material having the formula

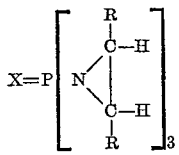

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl, and aralkyl radicals, and the R's can be unlike.

9. The composition of claim 8 in which the polymer is a polymer of butadiene and the reactant material is tri(2-methyl-1-aziridinyl)phosphine oxide.

10. The composition of claim 9 in which the polymer is polybutadiene, and the inorganic oxidizing salt is ammonium perchlorate.

11. The composition of claim 8 wherein said monomer is butadiene and said reactant material is tri-(2-methyl-1-aziridinyl)phosphine oxide.

12. The composition of claim 8 wherein said monomer is butadiene and said reactant material is tri(2-methyl-1-aziridinyl)phosphine sulfide.

13. The composition of claim 8 wherein said liquid polymer contains from 2 to 4 terminally positioned carboxy groups.

14. The composition of claim 8 wherein said liquid polymer is a copolymer of butadiene and acrylic acid.

15. The composition of claim 14 in which the reactant material is tri(2-methyl-1-aziridinyl)phosphine oxide and the inorganic oxidizing salt is ammonium perchlorate.

16. A method of preparing a solid propellant composition which comprises forming a mixture of an inorganic oxidizing salt, an uncured polymer selected from the group consisting of liquid and semisolid polymer of a monomer selected from the group consisting of conjugated dienes having 4 to 12 carbon atoms per molecule, aryl-substituted olefins, pyridine and quinoline derivatives containing at least one member selected from the group consisting of vinyl and alphamethylvinyl, acrylic acid esters, alkacrylic acid esters, vinylfuran and vinylcarbazole, said polymer containing at least 1 acid group of an element selected from the group consisting of carbon, silicon, tin arsenic, antimony, sulfur, selenium, and tellurium per molecule, and a reactant material in sufficient amount to provide a solid propellant structure on reacting with said uncured polymer, said material having the formula

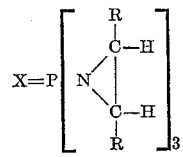

wherein X is selected from the group consisting of oxygen and sulfur, P is phosphorus, the R's are radicals containing up to a total of 20 carbon atoms selected from the group consisting of hydrogen, alkyl, cycloalkyl, aryl, alkaryl, and aralkyl radicals, and the R's can be unlike, and heating said admixture at a temperature in the range of 100 to 300° F. for a sufficient period of time to react said uncured polymer with said reactant material.

17. The method of claim 16 wherein said uncured polymer is a copolymer of said monomer with an unsaturated carboxylic acid having a maximum of 36 carbon atoms, from 1 to 4 double bonds and from 1 to 2 carboxyl groups.

18. The method of claim 17 in which the polymer is a copolymer of butadiene with acrylic acid, the reactant material is tri(2-methyl-1-aziridinyl)phosphine oxide and the inorganic oxidizing salt is ammonium perchlorate.

19. The method of claim 16 wherein said uncured polymer is a liquid polymer which contains from 2 to 4 terminally positioned acid groups.

20. The method of claim 19 in which the polymer is a polymer of butadiene and the reactant material is tri(2-methyl-1-aziridinyl)phosphine oxide.

21. The method of claim 20 in which the polymer is polybutadiene, the acid group is a carboxyl group and the inorganic oxidizing salt is ammonium perchlorate.

22. The method of claim 20 in which the acid group is a sulfuryl group and the inorganic oxidizing salt is ammonium perchlorate.

23. The method of claim 16 wherein said mixture is placed in a rocket case prior to said heating and the solid propellant is formed in situ.

References Cited in the file of this patent

UNITED STATES PATENTS

| | | |
|---|---|---|
| 2,479,470 | Carr | Aug. 16, 1949 |
| 2,563,265 | Parsons | Aug. 7, 1951 |
| 2,622,277 | Bonell et al. | Dec. 23, 1952 |
| 2,670,347 | Kuh et al. | Feb. 23, 1954 |
| 2,740,702 | Mace | Apr. 3, 1956 |
| 2,877,504 | Fox | Mar. 17, 1959 |

OTHER REFERENCES

Zaehringer: "Solid Propellant Rockets—Second Stage," American Rocket Co., Box 1112, Wyandotte, Mich. (September 1958), pages 203–219.